(12) United States Patent
Yuan et al.

(10) Patent No.: US 11,385,122 B2
(45) Date of Patent: Jul. 12, 2022

(54) METHOD AND DEVICE FOR DETECTING FAULT OF MONITORING DEVICE

(71) Applicants: HEFEI INSTITUTE FOR PUBLIC SAFETY RESEARCH, TSINGHUA UNIVERSITY, Anhui (CN); HEFEI ZEZHONG CITY INTELLIGENT TECHNOLOGY CO., LTD., Anhui (CN); OPERATION AND MONITORING CENTER FOR HEFEI URBAN SAFETY & SECURITY, Anhui (CN)

(72) Inventors: Hongyong Yuan, Anhui (CN); Ming Fu, Anhui (CN); Qiong Tan, Anhui (CN); Guofeng Su, Anhui (CN); Youping Zhu, Anhui (CN); Peng Wang, Anhui (CN)

(73) Assignees: Hefei Institute for Public Safety Research, Tsinghua University, Anhui (CN); Hefei Zezhong City Intelligent Technology Co., Ltd., Anhui (CN); Operation and Monitorina Center for Hefei Urban Safety & Security, Anhui (CN)

( * ) Notice: Subject to any disclaimer, the term of this patent is extended or adjusted under 35 U.S.C. 154(b) by 387 days.

(21) Appl. No.: 16/627,986

(22) PCT Filed: Dec. 20, 2018

(86) PCT No.: PCT/CN2018/122289
§ 371 (c)(1),
(2) Date: Dec. 31, 2019

(87) PCT Pub. No.: WO2020/052147
PCT Pub. Date: Mar. 19, 2020

(65) Prior Publication Data
US 2021/0293651 A1    Sep. 23, 2021

(30) Foreign Application Priority Data
Sep. 11, 2018 (CN) .......................... 201811058772.5

(51) Int. Cl.
*G06F 11/30* (2006.01)
*G01M 3/04* (2006.01)
*G08B 21/18* (2006.01)

(52) U.S. Cl.
CPC ............. *G01M 3/04* (2013.01); *G08B 21/187* (2013.01)

(58) Field of Classification Search
CPC ....................................................... G01M 3/04
See application file for complete search history.

(56) References Cited

U.S. PATENT DOCUMENTS

2017/0004433 A1\* 1/2017 Raghavan ........ G06Q 10/06393

FOREIGN PATENT DOCUMENTS

| CN | 103569817 A | 2/2014 |
|---|---|---|
| CN | 104075751 A | 10/2014 |

(Continued)

OTHER PUBLICATIONS

International Search Report for PCT/CN21018/122289 dated May 29, 2019. (Chinese only).
CN office action for CN Application No. 201811058772.5 dated Oct. 25, 2019; with English translation.

*Primary Examiner* — Phuong Huynh
(74) *Attorney, Agent, or Firm* — Martin & Ferraro, LLP

(57) ABSTRACT

The present disclosure provides a method and a device for detecting a fault of a monitoring device. The method includes: obtaining monitoring data at a preset sampling period, wherein the monitoring data comprises monitoring values respectively corresponding to a plurality of sampling points; calculating a monitoring value change rate between each monitoring value and a following monitoring value (Continued)

based on the preset sampling period; performing normalization processing on each monitoring value to obtain a normalized monitoring value corresponding to each monitoring value; determining a first number of monitoring values each having the monitoring value change rate greater than a preset change rate threshold and the normalized monitoring value greater than a preset monitoring value threshold; judging whether the first number is less than a first preset number threshold; and determining that the monitoring device has a fault if no.

13 Claims, 9 Drawing Sheets

(56) References Cited

FOREIGN PATENT DOCUMENTS

| | | | |
|---|---|---|---|
| CN | 104142680 | A | 11/2014 |
| CN | 104778111 | A | 7/2015 |
| CN | 105301453 | A | 2/2016 |
| CN | 105403705 | A | 3/2016 |
| CN | 105467975 | A | 4/2016 |
| CN | 105894027 | A | 8/2016 |
| CN | 106649755 | A | 5/2017 |
| CN | 107368058 | A | 11/2017 |
| CN | 107426019 | A | 12/2017 |
| CN | 107995049 | A | 5/2018 |
| CN | 108228862 | A | 6/2018 |
| CN | 108491861 | * | 9/2018 |
| CN | 108491861 | A | 9/2018 |
| JP | 2006153601 | A | 6/2006 |

* cited by examiner

US 11,385,122 B2

METHOD AND DEVICE FOR DETECTING FAULT OF MONITORING DEVICE

CROSS-REFERENCE TO RELATED APPLICATION

The present disclosure is a US National Phase Application under 35 USC § 371 of International Application No. PCT/CN2018/122289, filed on Dec. 20, 2018, which is based on and claims a-priority to Chinese Patent Application No. 201811058772.5, filed on Sep. 11, 2018 all of which are incorporated by reference herein.

TECHNICAL FIELD

The present disclosure relates to a field of computer technology, in particular to a method and a device for detecting a fault of a monitoring device.

BACKGROUND ART

Gas leakage monitoring is a necessary procedure to ensure a normal operation of gas pipelines. With increasing of density and operation time of urban underground gas pipeline networks, the distribution number of gas monitoring devices is also increasing. Therefore, it becomes challenging to find a fault device timely and ensure effectiveness of an alarm for gas pipeline leakage.

SUMMARY OF THE INVENTION

Embodiments of the present disclosure provides a method for detecting a fault of a monitoring device, which includes; obtaining monitoring data collected by the monitoring device at a preset sampling period, in which; the monitoring data includes monitoring values respectively corresponding to a plurality of sampling points; calculating a change monitoring value rate between each monitoring value and a following monitoring value adjacent to the monitoring value based on the preset sampling period, to obtain the change monitoring value rate of each monitoring value; performing normalization processing on each monitoring value to obtain a normalized monitoring value corresponding to each monitoring value; determining a first number of monitoring values each having the monitoring value change rate greater than a preset change rate threshold, and the normalized monitoring value greater than a preset monitoring value threshold; judging whether the first number is less than a first preset number threshold; and determining that the monitoring device has a fault in response to determining that the first number is greater than or equal to the first preset number threshold.

Embodiments of the present disclosure provides an electronic device, including: at least one processor; and a memory coupled to the at least one processor. The memory is configured to store instructions executable by the at least one processor. When the instructions are executed by the at least one processor, the method for detecting a fault of a monitoring device according to the first aspect of embodiments described above is implemented.

Embodiments of the present disclosure provide a monitoring system, including one or more monitoring devices, a processing device, and an alarm device. The one or more monitoring devices are arranged at a plurality of sampling points, and configured to collect monitoring data at a preset sampling period, in which, the monitoring data includes monitoring values respectively corresponding to the plurality of sampling points. The processing device is configured to perform the method for detecting a fault of a monitoring device according to embodiments of the present disclosure. The alarm device is configured to issue an alarm prompt message if the monitoring device has a fault.

Embodiments of the present disclosure provides a non-transitory computer readable storage medium. The non-transitory computer readable storage medium has computer instructions stored thereon. The computer instructions are used to enable the computer to execute the method for detecting a fault of the monitoring device according to the first aspect of embodiments of the present disclosure.

Embodiments of the present disclosure provides a computer program product. The method for detecting a fault of a monitoring device is implemented when instructions in the computer program product are executed by a processor.

Additional aspects and advantages of the present disclosure will be given in part in the following description, and become apparent from the following description, or be learned from the practice of the present disclosure.

BRIEF DESCRIPTION OF THE DRAWINGS

The foregoing and/or additional aspects and advantages of the present disclosure will become apparent and easily understood from the following description of embodiments with reference to the accompanying drawings, in which.

DETAILED DESCRIPTION

Reference will be made in detail below to embodiments of the present disclosure. Examples of embodiments are illustrated in the accompanying drawings, in which, the same or similar numbers represent the same or similar elements or elements with the same or similar functions. The embodiments described below by reference to the accompanying drawings are exemplary, which are intended to explain the present disclosure and are not to be construed as limiting the present disclosure.

A method and a device for detecting a fault of a monitoring device according to embodiments of the present disclosure will be described below with reference to the accompanying drawings.

Figure 1:
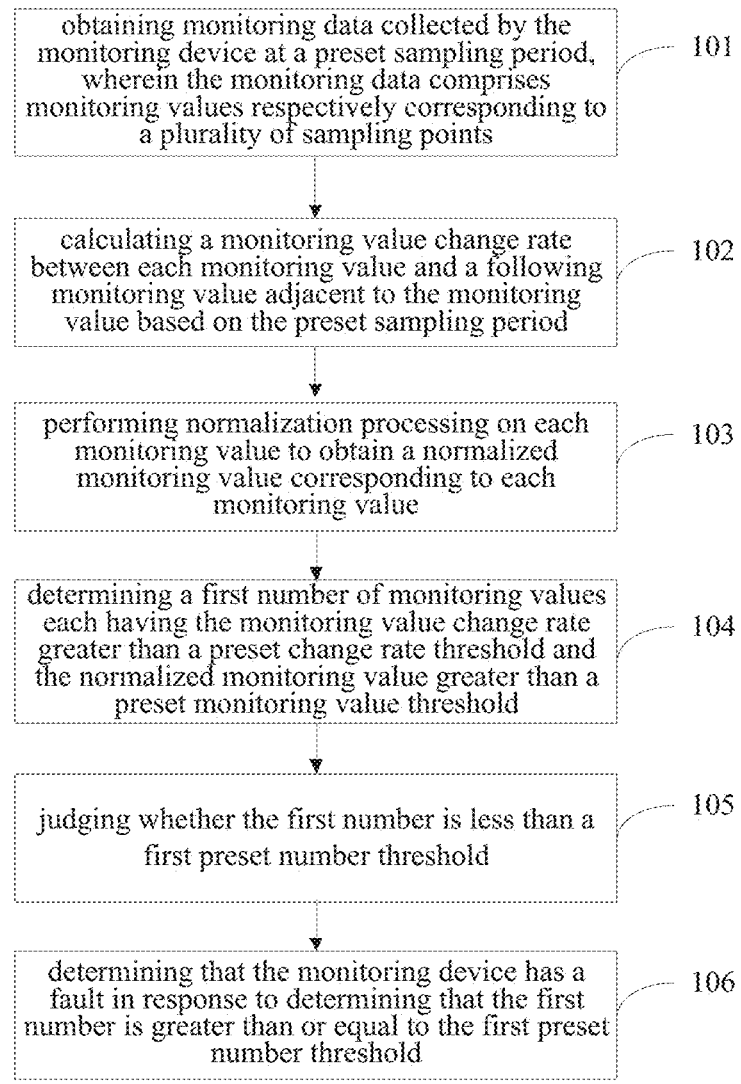
FIG. 1 is a flow chart illustrating a method for detecting a fault of a monitoring device according to embodiments of the present disclosure.

FIG. 1 is a flow chart illustrating a method for detecting a fault of a monitoring device according to an embodiment of the present disclosure.

As illustrated in FIG. 1, the method for detecting a fault of a monitoring device includes the following.

At block 101, monitoring data collected by the monitoring device at a preset sampling period is obtained. The monitoring data includes monitoring values respectively corresponding to a plurality of sampling points.

It should be noted that index items to be monitored by the monitoring device are different in different application scenarios. For example, in an environmental monitoring system, the monitoring device detects an environmental index value in an environment. As another example, in a gas leakage monitoring system, the monitoring device may be a gas monitoring device for an inspection well. The gas monitoring device may monitor methane concentration.

It should be noted that this embodiment takes that the monitoring device is the gas monitoring device for the inspection well as an example for describing.

The number of the monitoring values affects the judgment of whether the monitoring device has a fault. As an exemplary implementation, in order to obtain a better fault detection effect, the monitoring values for a preset time length may be obtained.

The preset time length may be 24 hours. In this way, effect of the number of monitoring values on identification effect of a pseudo error is avoided by determining the preset time length, such that the better fault detection effect may be obtained.

At block 102, a monitoring value change rate between each monitoring value and following monitoring value adjacent to the monitoring value based on the preset sampling period.

The monitoring value change rate $x_j'$ of the $j^{th}$ monitoring value $x_j'$ is calculated by $$x_j' = \frac{|x_{j+1} - x_j|}{T},$$

where, T represents the preset sampling period; and $x_{j+1}$ represents the $(j+1)^{th}$ monitoring value;

At block 103, normalization processing is performed on each monitoring value, to obtain a normalized monitoring value corresponding to each monitoring value.

Since amplitudes of monitoring data are different each day, a fluctuation amplitude may not be determined by judging whether a determined amplitude is exceeded. There, a relative amplitude may be determined within a maximum amplitude of the monitoring values on the day by unitizing (i.e., normalizing) the monitoring values.

As an exemplary implementation, performing normalization processing on each monitoring value to obtain the normalized monitoring value corresponding to each monitoring value specifically includes: obtaining a maximum monitoring value and a minimum monitoring value of the monitoring values; and performing normalization processing on each monitoring value based on the maximum monitoring value and the minimum monitoring value to obtain a normalized monitoring value corresponding to each monitoring value.

In detail, after a plurality of monitoring values are obtained, all monitoring values may be traversed to count the minimum monitoring value and the maximum monitoring value.

In detail, the normalized monitoring value $V_j$ of the $j^{th}$ monitoring value $x_j'$ is calculated by $$V_j = \frac{x_j - x_{min}}{x_{max} - x_{min}},$$

where, $x_{min}$ represents the minimum monitoring value, and $x_{max}$ represents the maximum monitoring value.

At block 104, a first number of monitoring values each having the monitoring value greater than a preset change rate threshold and the normalized monitoring value greater than a preset monitoring value threshold are determined.

After the monitoring value change rate of each monitoring value is obtained and the monitoring values are normalized, it is judged whether a monitoring value change rate of a current monitoring value is greater than the preset change rate threshold for each monitoring value in the monitoring data, and whether a normalized monitoring value of the current monitoring value is greater than the preset monitoring value threshold. The first number of which the monitoring value change rate is greater than the preset change rate threshold and the normalized monitoring value is greater than the preset monitoring value threshold is obtained according to judging results of all the monitoring values. In other words, abnormal times of the monitoring values of which the monitoring value change rate is greater than the preset change rate threshold and the normalized monitoring value is greater than the preset monitoring value threshold are counted.

It should be noted that, for the current monitoring value, if it is judged that the monitoring value change rate of the current monitoring value is greater than the preset change rate threshold and the normalized monitoring value of the current monitoring value is greater than the preset monitoring value threshold, the current monitoring value is indicated to be an abnormal monitoring value. The preset monitoring value threshold and the preset change rate threshold are preset values.

The preset monitoring value threshold and the preset change rate threshold are predetermined according to historical normal monitoring data and historical abnormal monitoring data. The detailed procedure for predetermining the preset monitoring value threshold and the preset change rate threshold will be described in subsequent embodiments.

At block 105, it is judged whether the first number of the monitoring values is less than a first preset number threshold.

The first preset number threshold is a preset number threshold of monitoring values which are abnormal.

At block 106, it is determined that the monitoring device has a fault in response to determining that the first number of the monitoring values is greater than or equal to the first preset number threshold.

For example, the first preset number threshold is 8, after monitoring data at a certain day collect by the monitoring device is obtained, if it is determined that the first number of the monitoring values in the monitoring data each having the monitoring value change rate greater than the preset change rate threshold and the normalized monitoring value greater than the preset monitoring value threshold is 2, that is, the abnormality of the monitoring data is twice at this time, it may be determined that the monitoring device is normal. If it is determined that the first number of the monitoring values in the monitoring data each having the monitoring value change rate greater than the preset change rate threshold and the normalized monitoring value greater than the preset monitoring value threshold is 12 times, that is, the abnormality of the monitoring data is 12 times, it may be determined that the monitoring device has a fault.

In conclusion, it may be seen that, according to the embodiment, it is monitored whether the monitoring device has the fault by analyzing a change rule of monitoring data of the monitoring device, and analyzing data with a larger change rate relative to a change rule of normal data and a higher occurrence frequency. Therefore, by analyzing the monitoring data, a state of the monitoring device may be evaluated and diagnosed effectively and accurately, accuracy of data analysis may be improved, and real-time monitoring for a leakage condition of gas pipelines in the city may be better implemented.

With the method for detecting the fault of the monitoring device according to embodiments of the present disclosure, the monitoring data collected by the monitoring device at the preset sampling period is obtained, the monitoring value change rate between each monitoring value and the following monitoring value adjacent to the monitoring value is calculated based on the preset sampling period to obtain the monitoring value change rate of each monitoring value, normalization processing is performed on each monitoring value to obtain the normalized monitoring value corresponding to each monitoring value, the first number of the monitoring values each having the monitoring value change rate greater than the preset change rate threshold and the normalized monitoring value greater than the preset monitoring value threshold is determined, and it is determined that the monitoring device has the fault in response to determining that the first number is greater than or equal to the first preset number threshold. Therefore, it may be determined whether the monitoring device has the fault by analyzing the monitoring data of the monitoring device, thereby facilitating to determine whether the monitoring equipment has the fault.

It should be understood that when it is determined that the corresponding monitoring device has the fault according to a detection device, an alarm prompt message may also be issued, such that a user may maintain the monitoring device having the fault according to the alarm prompt message.

It should be understood that, when the monitoring device is a gas monitoring device for an inspection well, an alarm is issued for a fault device, such that operation and maintenance personnel may process the fault device timely and effectively, normal operation of a monitoring system for gas pipeline leakage in the city is maintained, and safe operation guarantee may be provided for the operation of urban gas pipelines.

On the basis of the above embodiments, when it is determined that the first number of monitoring values each having the monitoring value change rate greater than the preset change rate threshold and the normalized monitoring value greater than the preset monitoring value threshold is greater than the first preset number threshold, it may be determined that one type of fault occurs in the monitoring device, and other types of faults may occur in the monitoring device in actual application.

It should be understood that the change rules of the monitoring values in the monitoring device may be different when it is judged that the other types of faults occur in the monitoring device. Therefore, as an exemplary implementation, when it is determined whether the monitoring device has a fault, the method for detecting a fault of a monitoring device of the embodiment may further include: determining a second number of monitoring values each having the monitoring value change rate equal to zero; judging whether the second number is greater than or equal to a second preset number threshold and whether each of the monitoring values is equal to zero in response to determining that the first number is less than the first preset number threshold; and determining that the monitoring device has a fault in response to determining that the second number is greater than or equal to the second preset number threshold and a monitoring value not equal to zero exists.

It should be noted that, if it is judged that the second number of the monitoring values is greater than or equal to the second preset number threshold and the monitoring value not equal to zero exists, the monitoring data corresponding to the monitoring device hardly fluctuates, and the monitoring of the monitoring device has a fault.

The second preset number threshold is determined according to the number of the monitoring values, and the second preset number threshold is slightly less than the number of the monitoring values.

For example, the second preset number threshold may be a value obtained by subtracting 3 from the number of monitoring values.

Figure 2:
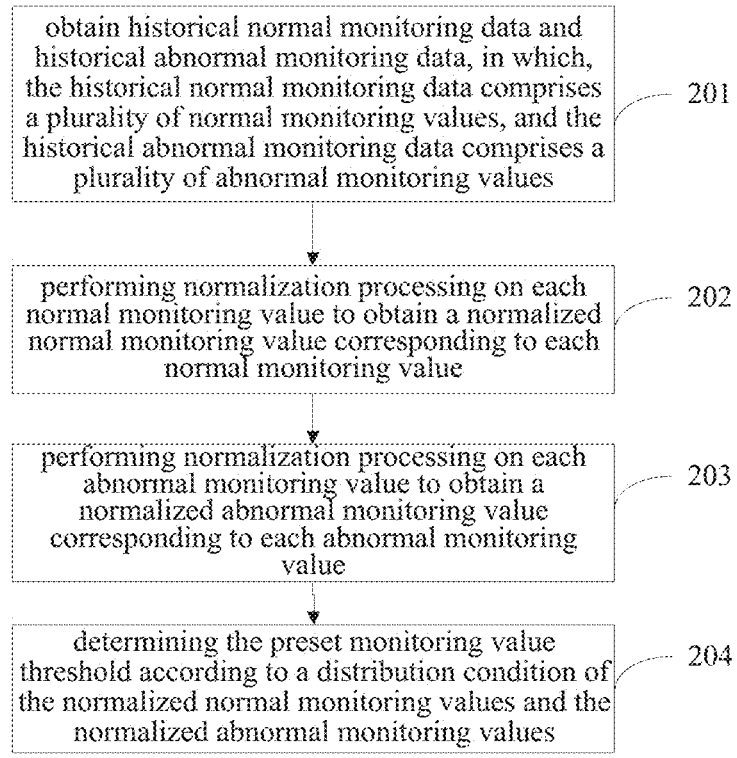
FIG. 2 is a detailed flow chart illustrating predetermining a preset monitoring value threshold.

In an embodiment of the application, the preset monitoring value threshold may be predetermined in the following way, as illustrated in FIG. 2, and the specific procedure is as follows.

At block 201, historical normal monitoring data and historical abnormal monitoring data are obtained, in which, the historical normal monitoring data includes a plurality of normal monitoring values, and the historical abnormal monitoring data includes a plurality of abnormal monitoring values.

At block 202, normalization processing is performed on each normal monitoring value to obtain a normalized normal monitoring value corresponding to each normal monitoring value.

At block 203, normalization processing is performed on each abnormal monitoring value to obtain a normalized abnormal monitoring value corresponding to each abnormal monitoring value.

At block 204, the preset monitoring value threshold is determined according to a distribution condition of the normalized normal monitoring values and the normalized abnormal monitoring values.

Figure 3:
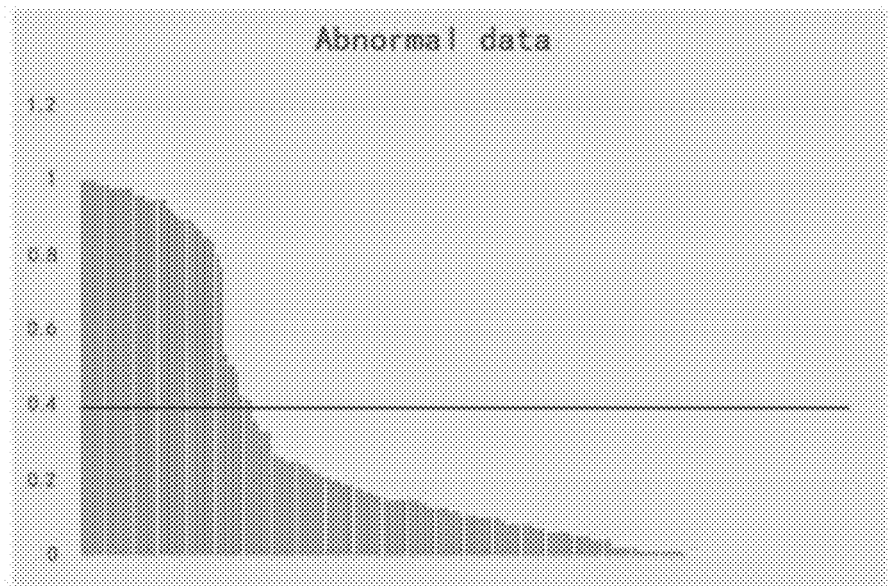
FIG. 3 is a schematic diagram illustrating normalized normal monitoring data.
Figure 4:
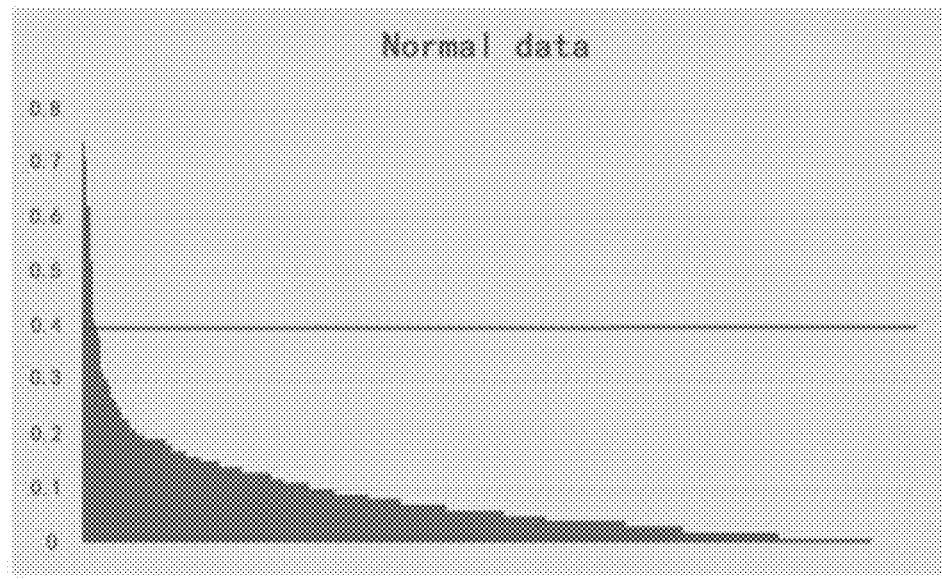
FIG. 4 is a schematic diagram illustrating normalized abnormal monitoring data.

For example, taking normal monitoring data and abnormal monitoring data collected at a certain day as an example, it is assumed that a schematic diagram of normalized normal monitoring data is illustrated in FIG. 3, and a schematic diagram of normalized abnormal monitoring data is illustrated in FIG. 4. By analyzing the distribution conditions of the normalized normal monitoring data and the normalized abnormal monitoring data, it may be determined that relative amplitudes of adjacent data with a large change rate in the abnormal data is concentrated above 0.4; and relative amplitudes of the normal data is mostly distributed below 0.4. And a preset monitoring value threshold may be determined to be 0.4.

Figure 5:
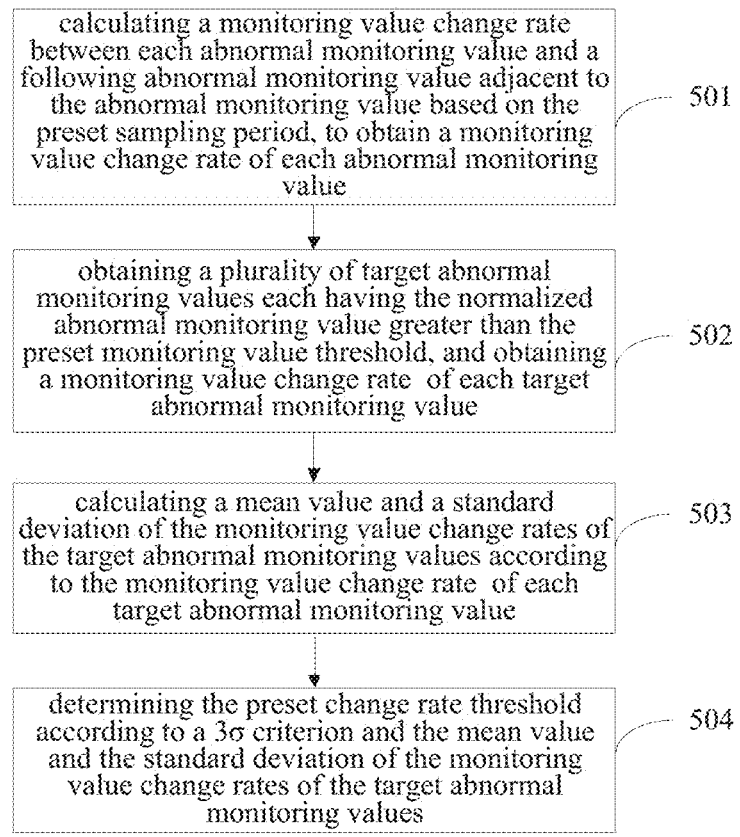
FIG. 5 is a refined flow chart illustrating predetermining a preset change rate threshold.

On the basis of the embodiment illustrated in FIG. 2, a sampling period between monitoring values in historical normal monitoring data and a sampling period between monitoring values in historical abnormal monitoring data are equal to the preset sampling period. In order to predetermine a preset change rate threshold, as shown in FIG. 5, the method further includes the following.

At block 501, a monitoring value change rate between each abnormal monitoring value and a following abnormal monitoring value adjacent to the abnormal monitoring value is calculated based on the preset sampling period to obtain the monitoring value change rate of each abnormal monitoring value.

At block 502, a plurality of target abnormal monitoring values each having the normalized abnormal monitoring value greater than the preset monitoring value threshold are obtained, and a monitoring value change rate of each target abnormal monitoring value is obtained.

At block 503, a mean value and a standard deviation of the monitoring value change rates of the target abnormal monitoring values are calculated according to the monitoring value change rate of each target abnormal monitoring value.

In other words, target abnormal monitoring values with larger relative amplitudes in the abnormal monitoring value are obtained, and the mean value and the standard deviation of the monitoring value change rates of the target abnormal monitoring values are determined according to the monitoring value change rate of the target abnormal monitoring values.

The mean value $\mu$ for the monitoring value change rate of the target abnormal monitoring value is calculated by $$\mu = \frac{\sum_{j=1}^{n} x'_{1j}}{n},$$

where, n represents the number of the target abnormal monitoring values, and $x_{1j}'$ represents the monitoring value change rate of the $j^{th}$ target abnormal monitoring value.

Then the standard deviation $\sigma$ of these data is solved by $$\sigma = \sqrt{\frac{\sum_{j=1}^{n}(x'_{1j} - \mu)^2}{n}}.$$

It should be noted that, in order to accurately determine the preset change rate threshold, a mass of target abnormal monitoring values may be obtained, such that the preset change rate threshold may be determined by the monitoring value change rates corresponding to the mass of target abnormal monitoring values.

It should be understood that the distribution of the monitoring value change rates corresponding to the target abnormal monitoring values may be regarded as a normal distribution when the number of the target abnormal monitoring values is more enough.

At block 504, the preset change rate threshold is determined according to a 3σ criterion and the mean value and the standard deviation of the monitoring value change rates of the target abnormal monitoring values.

It should be understood that, when the distribution of the monitoring value change rates corresponding to the target abnormal monitoring values conforms with the normal distribution, it may be determined that all the monitoring value change rates of the target abnormal monitoring values are concentrated in a range (μ−3σ, μ+3σ) according to the 3σ criterion, and the mean value and the standard deviation of the monitoring value change rates of the target abnormal monitoring values. Therefore, the preset change rate threshold $\Delta = \mu - 3\sigma$ may be determined according to the 3σ criterion, the mean value and the standard deviation of the monitoring value change rates the target abnormal monitoring values.

For example, when a mean value of the change rates with a larger fluctuation is calculated to be μ=7.0 and a standard deviation the change rates with a larger fluctuation is calculated to be σ=1.77 based on historical data, the preset change rate threshold may be determined to be μ−3σ=1.71 according to the 3σ criterion, the mean value and the standard deviation of the monitoring value change rates the target abnormal monitoring values.

Figure 6:
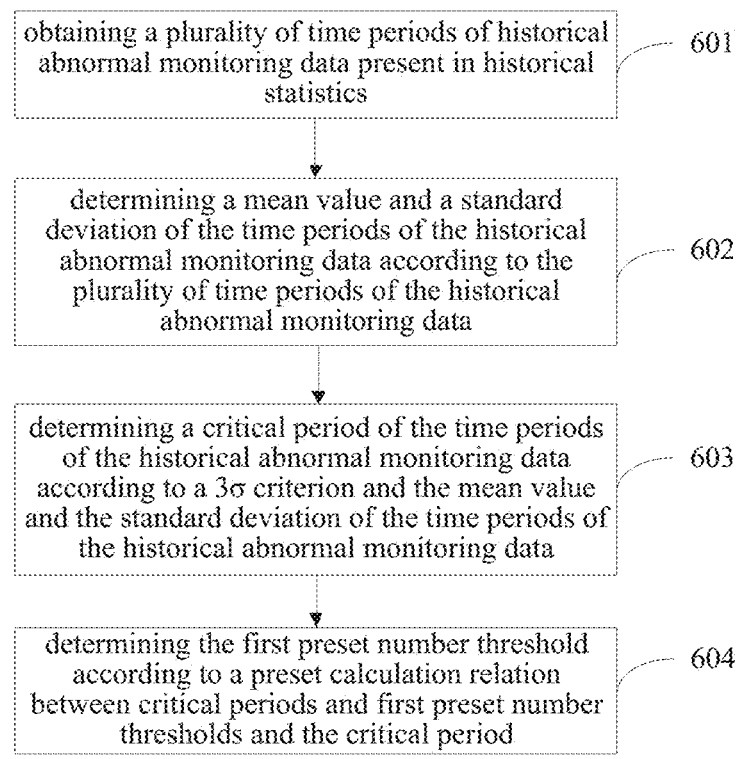
FIG. 6 is a refined flow chart illustrating predetermining a first preset number threshold.

In an embodiment of the present disclosure, the first preset number threshold is predetermined in the following way. As illustrated in FIG. 6, and the specific procedure may be at block 601, obtaining a plurality of time periods of historical abnormal monitoring data present in historical statistics:

at block 602, determining a mean value and a standard deviation of the time periods of the historical abnormal monitoring data according to a plurality of time periods of the historical abnormal monitoring data;

at block 603, determining a critical period of the time periods of the historical abnormal monitoring data according to a 3σ criterion and the mean value and the standard deviation of the time periods of the historical abnormal monitoring data; and at block 604, determining the first preset number threshold according to a preset calculation relation between critical periods and first preset number thresholds and the critical period.

The first preset number threshold $N_0$ is calculated according to the critical period $T_0$ by $$N_0 = \text{floor}\left(\frac{24}{T_0}\right) \times 2,$$

where, floor( ) is a rounding-down function. For example, assuming that the critical period $T_0$=5.3 h is obtained within a stage, a threshold of the abnormal times is determined to be $N_0$=floor(4.5)×2=8 times.

Figure 7:
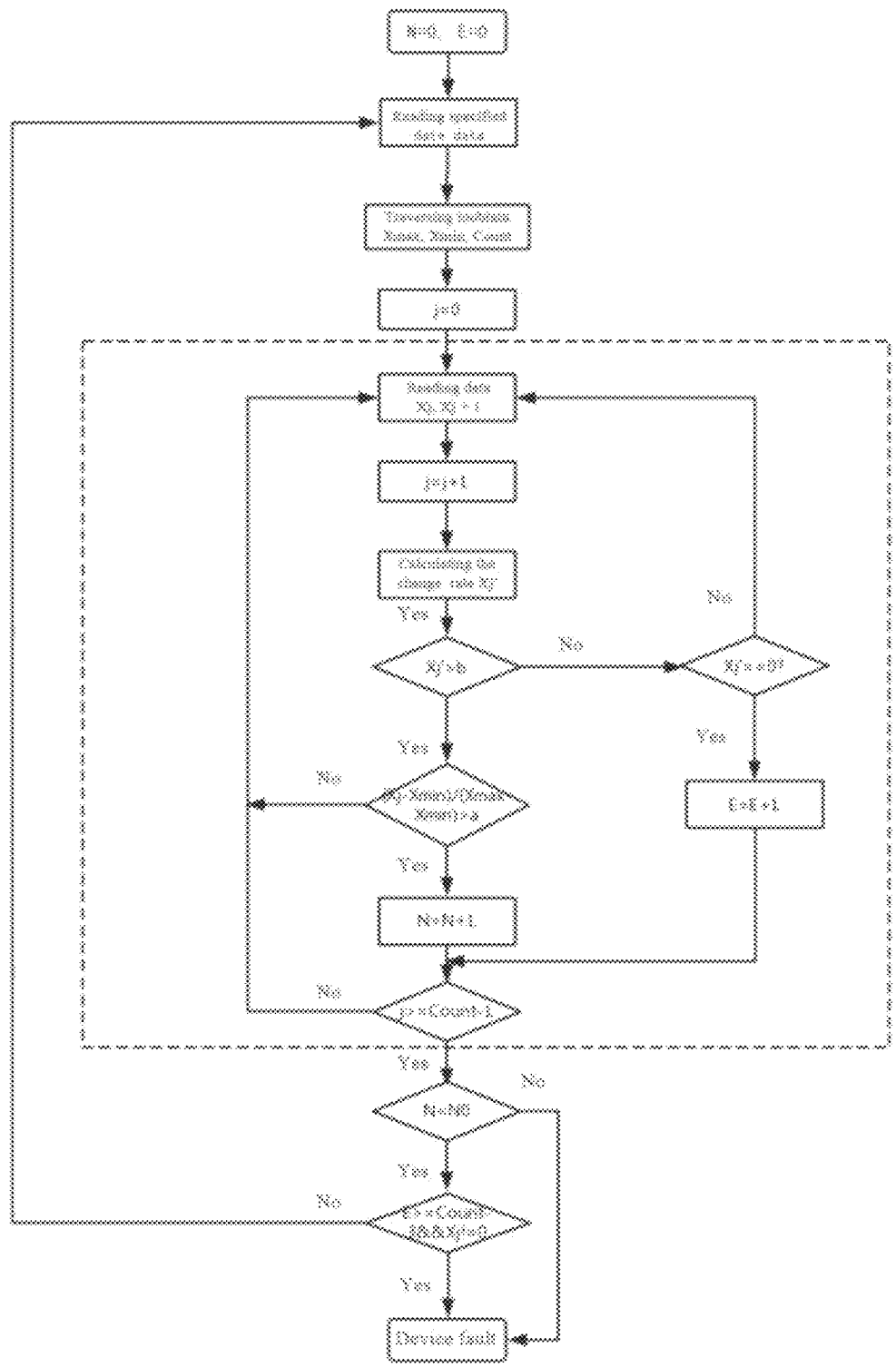
FIG. 7 is a flow chart illustrating a method for detecting a fault of a monitoring device according to a detailed embodiment of the present disclosure.

The method for detecting a fault of the monitoring device of this embodiment will be described below with reference to FIG. 7. The embodiment takes methane concentration monitoring data as an example, and the specific procedure includes the following.

1. Monitoring data of methane concentration of the monitoring device at a specified date is read.

The monitoring data includes a plurality of monitoring values.

2. The monitoring values in the monitoring data are traversed, a maximum value Xmax and a minimum value Xmin of the methane concentration are counted, and the number Count of the monitoring values on the day is recorded.

3. A change rate $x_j'$ between the $j^{th}$ monitoring value and the $(j+1)^{th}$ monitoring value is calculated as follows by using original data, reserving two decimal places in a result, and the result is stored into a floating point type array:

$$x_j' = \frac{|x_{j+1} - x_j|}{T},$$

where, T is a sampling period, $x_j$ represents the $j^{th}$ monitoring value, and $x_{j+1}$ represents the $(j+1)^{th}$ monitoring value.

4. It is judged whether the change rate $x_j'$ between the $j^{th}$ monitoring value and the $(j+1)^{th}$ monitoring value is greater than a preset change rate threshold b. If so, it is continuously judged whether a normalized monitoring value $$\frac{x_j - x_{min}}{x_{max} - x_{min}}$$

corresponding to the $j^{th}$ monitoring value is greater than a preset monitoring threshold a.

If the normalized monitoring value $$\frac{x_j - x_{min}}{x_{max} - x_{min}}$$

corresponding to the $j^{th}$ monitoring value is greater than the preset monitoring threshold a, the first number N of the monitoring values is added by 1, then it is continuously judged whether j is greater than or equal to Count−1, and if not, a following monitoring value is read continuously.

If it is judged that the change rate $x_j'$ between the $j^{th}$ monitoring value and the $(j+1)^{th}$ monitoring value is less than the preset change rate threshold b, it is continuously judged whether the change rate $x_j'$ between the $j^{th}$ monitoring value and the $(j+1)^{th}$ monitoring value is equal to zero, and if so, the second number E of the monitoring values is added by 1.

5. It is judged whether the first number N of the monitoring values is less than the first preset number threshold N0 when it is judged that j is greater than or equal to Count−1. If it is judged that the first number N of the monitoring values is greater than or equal to the first preset number threshold N0, it is determined that the monitoring device has a fault.

If the first number N of the monitoring values is less than the first preset number threshold N0, it is judged whether E is greater than or equal to Count−3. If it is judged that E is greater than or equal to Count−3 and the monitoring data of the methane concentration is not constant to 0, it is determined that the monitoring device has a fault.

If not, the monitoring data at the specified date is read continuously.

With the device for detecting the fault of the monitoring device according to embodiments of the present disclosure, the monitoring data collected by the monitoring device at the preset sampling period is obtained, the monitoring value change rate between each monitoring value and the following monitoring value adjacent to the monitoring value is calculated based on the preset sampling period to obtain the monitoring value change rate of each monitoring value, normalization processing is performed on each monitoring value to obtain the normalized monitoring value corresponding to each monitoring value, the first number of the monitoring values each having the monitoring value change rate greater than the preset change rate threshold and the normalized monitoring value greater than the preset monitoring value threshold is determined, and it is determined that the monitoring device has the fault in response to determining that the first number is greater than or equal to the first preset number threshold. Therefore, it may be determined whether the monitoring device has the fault by analyzing the monitoring data of the monitoring device, thereby facilitating to determine whether the monitoring equipment has the fault.

Embodiments of the present disclosure also provide a device for detecting a fault of a monitoring device.

Figure 8:
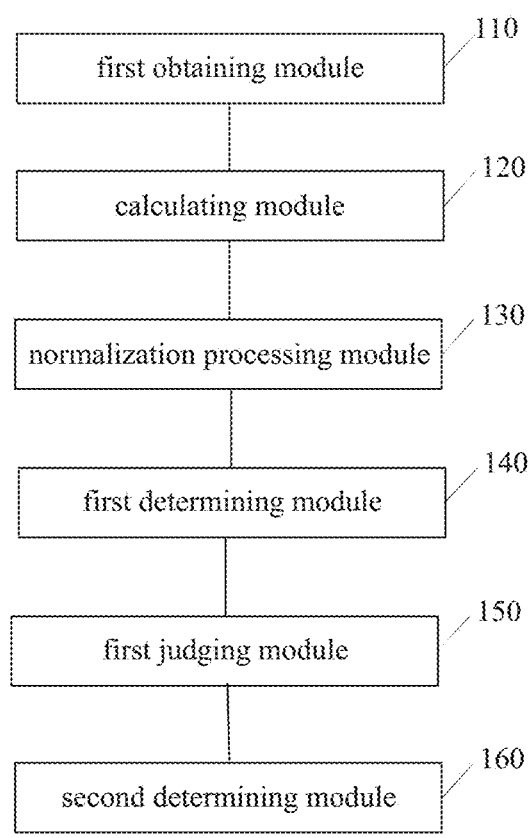
FIG. 8 is a block diagram illustrating a device for detecting a fault a monitoring device according to embodiments of the present disclosure.

FIG. 8 is a block diagram illustrating a device for detecting a fault of a monitoring device according to embodiments of the present disclosure.

As illustrated in FIG. 8, the device for detecting a fault of a monitoring device includes a first obtaining module 110, a calculating module 120, a normalization processing module 130, a first determining module 140, a first judging module 150, and a second determining module 160.

The first obtaining module 110 is configured to obtain monitoring data collected by the monitoring device at a preset sampling period, in which, the monitoring data includes monitoring values respectively corresponding to a plurality of sampling points.

The calculating module 120 is configured to calculate a monitoring value change rate between each monitoring value and a following monitoring value monitoring value adjacent to the monitoring value based on the preset sampling period.

The normalization processing module 130 is configured to perform normalization processing on each monitoring value to obtain a normalized monitoring value corresponding to each monitoring value.

The first determining module 140 is configured to determine a first number of monitoring values each having the monitoring value change rate greater than a preset change rate threshold and the normalized monitoring value greater than a preset monitoring value threshold.

The first judging module 150 is configured to judge whether the first number s is less than a first preset number threshold.

The second determining module 160 is configured to determine that the monitoring device has a fault in response to determining that the first number is greater than or equal to the first preset number threshold.

Figure 9:
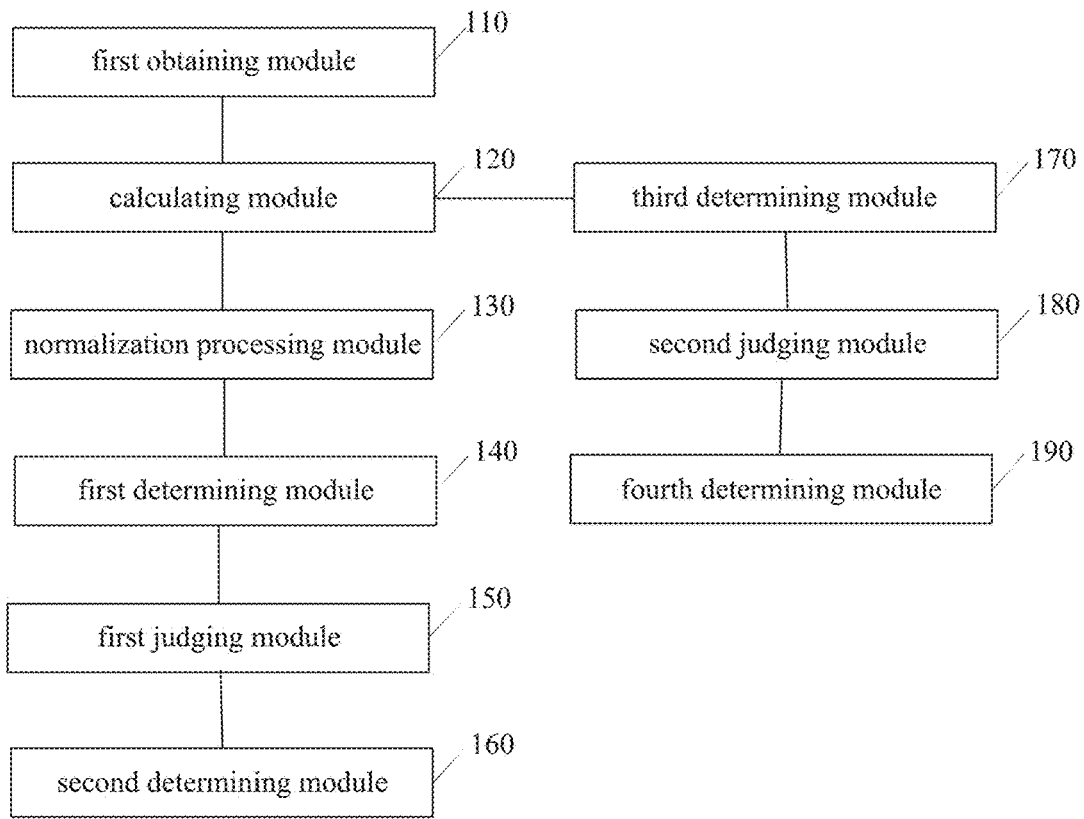
FIG. 9 is a block diagram illustrating a device for detecting a fault of a monitoring device according to embodiments of the present disclosure.

In an embodiment of the present disclosure, on the basis illustrated in FIG. 8, as illustrated in FIG. 9, the device may further includes: a third determining module 170, a second judging module 180, and a third fourth determining module 190.

The third determining module 170 is configured to determine a second number of monitoring values each having the monitoring value change rate equal to zero.

The second judging module 180 is configured to judge whether the second number is greater than or equal to a second preset number threshold and whether each monitoring value is equal to zero in response to determining that the first number is less than the first preset number threshold.

The fourth determining module 190 is configured to determine that the monitoring device has a fault in response to determining that the second number is greater than or equal to the second preset number threshold and a monitoring value not equal to zero exists.

In an embodiment of the present disclosure, the normalization processing module 130 is specifically configured to obtain a maximum monitoring value and a minimum monitoring value of the monitoring values; and to perform normalization processing respectively on each monitoring value based on the maximum monitoring value and the minimum monitoring value, to obtain a normalized monitoring value corresponding to each monitoring value.

Figure 10:
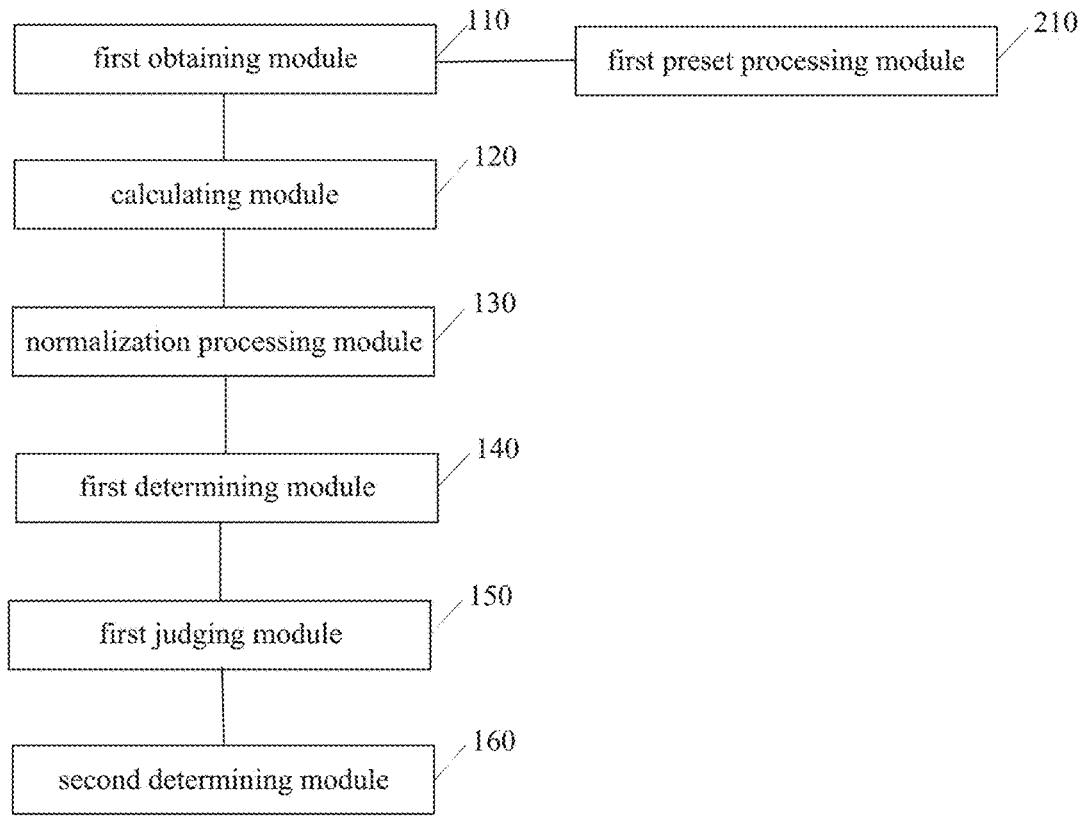
FIG. 10 is a block diagram illustrating a device for detecting a fault of a monitoring device according to embodiments of the present disclosure.

In an embodiment of the present disclosure, on the basis illustrated in FIG. 8, as illustrated in FIG. 10, the device may further includes: a first preset processing module 210, configured to obtain historical normal monitoring data and historical abnormal monitoring data, in which, the historical normal monitoring data includes a plurality of normal monitoring values, and the historical abnormal monitoring includes comprises a plurality of abnormal monitoring values; to perform normalization processing on each normal monitoring value to obtain a normalized normal monitoring value corresponding to each normal monitoring value; to perform normalization processing on each abnormal monitoring value to obtain a normalized abnormal monitoring value corresponding to each abnormal monitoring value; and to determine the preset monitoring value threshold according to distribution conditions of the normalized normal monitoring values and the normalized abnormal monitoring values.

A sampling period between monitoring values in the historical normal monitoring data and a sampling period between monitoring values in the historical abnormal monitoring data are equal to the preset sampling period.

Figure 11:
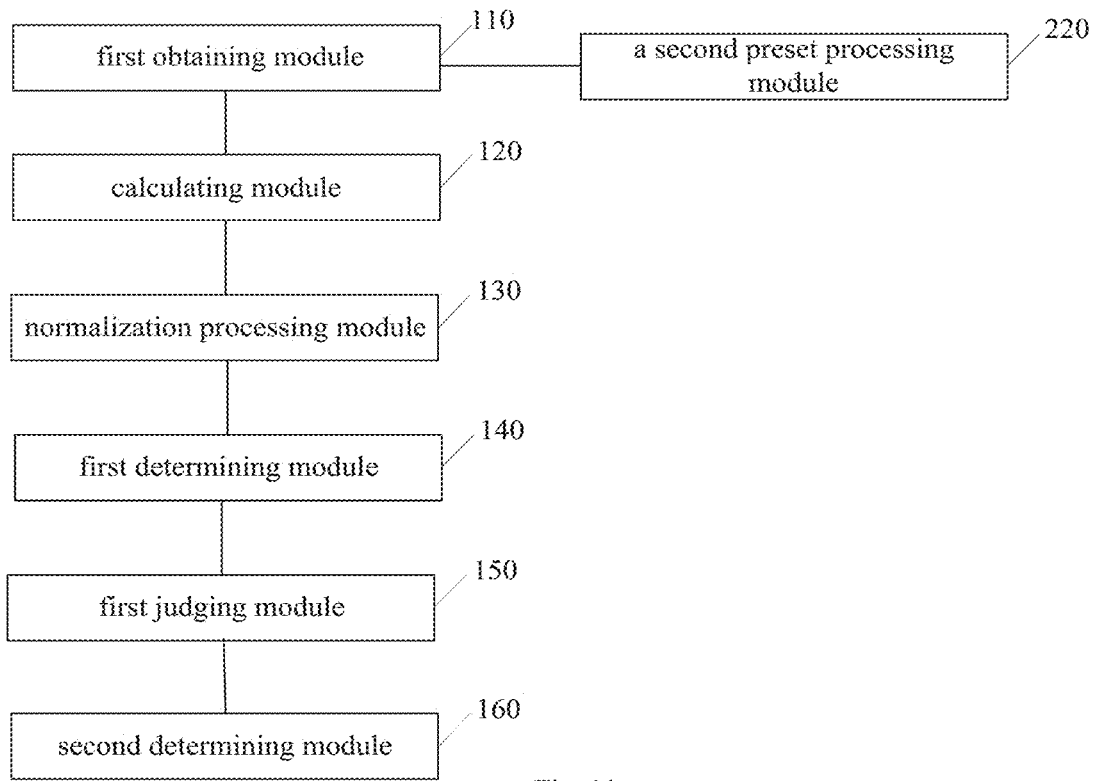
FIG. 11 is a block diagram illustrating another device for detecting a fault of a monitoring device according to embodiments of the present disclosure.

In an embodiment of the present disclosure, on the basis illustrated in FIG. 8, as illustrated in FIG. 11, the device further includes: a second preset processing module 220, configured to calculate a monitoring value change rate between each abnormal monitoring value and a following the next adjacent abnormal monitoring value adjacent to the abnormal monitoring value based on according the preset sampling period to obtain a monitoring value change rate of each abnormal monitoring value; to obtain a plurality of target abnormal monitoring values each having the normalized abnormal monitoring value greater than the preset monitoring value threshold, and to obtain a monitoring value change rate of each target abnormal monitoring value; to calculate a mean value and a standard deviation of the monitoring value change rate of the target abnormal monitoring values according to the monitoring value change rate of each target abnormal monitoring value; and to determine the preset change rate threshold according to a 3σ criterion and the mean value and the standard deviation of the monitoring value change rates of the target abnormal monitoring values.

Figure 12:
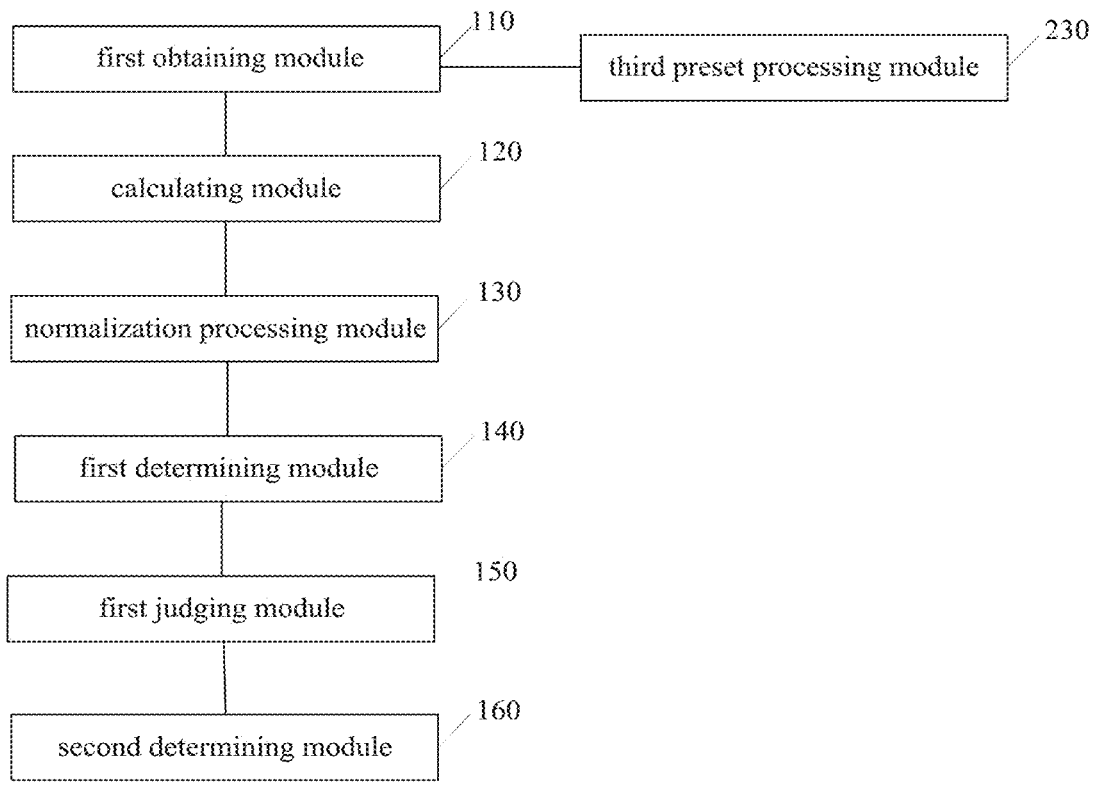
FIG. 12 is a block diagram lustrating another device for detecting a fault of a monitoring device according to embodiments of the present disclosure.

In an embodiment of the present disclosure, on the basis illustrated in FIG. 8, as illustrated in FIG. 12, the device may further includes: a third preset module 230, configured to obtain a plurality of time periods of historical abnormal monitoring data present in historical statistics; to determine a mean value and a standard deviation of the time periods of the historical abnormal monitoring data according to the plurality of time periods of the historical abnormal monitoring data; to determine a critical period of the time periods of the historical abnormal monitoring data according to a 3σ criterion and the mean value and the standard deviation of the time periods of the historical abnormal monitoring data; and to determine the first preset number threshold according to a preset calculation relation between critical periods and first preset number thresholds and the critical period.

It should be noted that the above explanation for the embodiments of the method for detecting the fault of the monitoring device is also applicable to the device for detecting the fault of the monitoring device in this embodiment, which is not elaborated herein.

With the device for detecting the fault of the monitoring device according to embodiments of the present disclosure, the monitoring data collected by the monitoring device at the preset sampling period is obtained, the monitoring value change rate between each monitoring value and the following monitoring value adjacent to the monitoring value is calculated based on the preset sampling period to obtain the monitoring value change rate of each monitoring value, normalization processing is performed on each monitoring value to obtain the normalized monitoring value corresponding to each monitoring value, the first number of the monitoring values each having the monitoring value change rate greater than the preset change rate threshold and the normalized monitoring value greater than the preset monitoring value threshold is determined, and it is determined that the monitoring device has the fault in response to determining that the first number is greater than or equal to the first preset number threshold. Therefore, it may be determined whether the monitoring device has the fault by analyzing the monitoring data of the monitoring device, thereby facilitating to determine whether the monitoring equipment has the fault.

Figure 13:
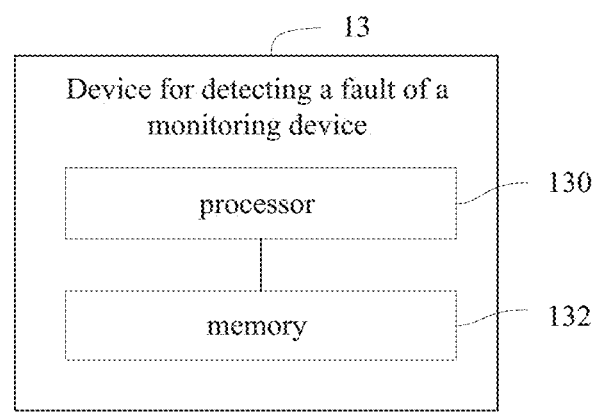
FIG. 13 is a block diagram of a device for detecting a fault of a monitoring device according to embodiments of the present disclosure.

FIG. 13 is a block diagram illustrating a device 13 for detecting a fault of a monitoring device according to embodiments of the present disclosure. The device 13 includes a processor 130 and a memory 132. The memory 132 is coupled to the processor 130 and is configured to store a computer program executable by the processor. The processor 130 is configured to perform the method for detecting a fault of a monitoring device according to the above embodiments by reading the computer program stored in the memory 132.

Figure 14:
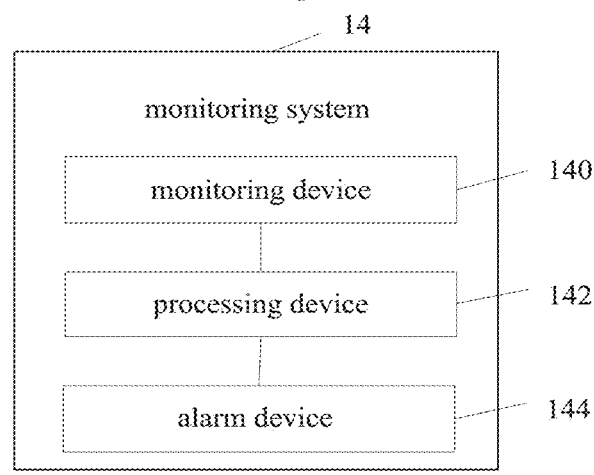
FIG. 14 is a block diagram of a monitoring system according to embodiments of the present disclosure.

FIG. 14 is a block diagram illustrating a monitoring system 14 according to embodiments of the present disclosure. The monitoring system 14 includes one or more monitoring devices 140, a processing device 142, and an alarm device 144. The one or more monitoring devices 140 are arranged at a plurality of sampling points, and configured to collect monitoring data at a preset sampling period in which the monitoring data includes monitoring values respectively corresponding to the plurality of sampling points. The processing device 142 is configured to perform the method for detecting a fault of a monitoring device according to the above embodiments. The alarm device 144 is configured to issue an alarm prompt message if the monitoring device has a fault.

In order to implement the above embodiments, embodiments of the present disclosure also provide a computer device, which includes a memory, a processor and a computer program stored in the memory and executable by the processor. The processor is configured to execute the program for:

obtaining monitoring data collected by the monitoring device at a preset sampling period, in which, the monitoring data includes monitoring values respectively corresponding to a plurality of sampling points;

calculating a monitoring value change rate between each monitoring value and a following monitoring value adjacent to the monitoring value based on the preset sampling period;

performing normalization processing on each monitoring value to obtain a normalized monitoring value corresponding to each monitoring value;

determining a first number of monitoring values each having the monitoring value change rate greater than a preset change rate threshold and the normalized monitoring value greater than a preset monitoring value threshold;

judging whether the first number is less than a first preset number threshold; and determining that the monitoring device has a fault in response to determining that the first number is greater than or equal to the first preset number threshold.

To implement the above embodiments, embodiments of the present disclosure also provide a non-temporary computer readable storage medium having a computer program stored thereon. The program is executed by a processor for:

obtaining monitoring data collected by the monitoring device at a preset sampling period, in which, the monitoring data includes monitoring values respectively corresponding to a plurality of sampling points;

calculating a monitoring value change rate between each monitoring value and a following monitoring value adjacent to the monitoring value based on the preset sampling period:

performing normalization processing on each monitoring value to obtain a normalized monitoring value corresponding to each monitoring value;

determining a first number of monitoring values each having the monitoring value change rate greater than a preset change rate threshold and the normalized monitoring value greater than a preset monitoring value threshold;

judging whether the first number is less than a first preset number threshold; and determining that the monitoring device has a fault in response to determining that the first number is greater than or equal to the first preset number threshold.

The present disclosure discloses a computer program product. The method for detecting a fault of a monitoring device is implemented when instructions in the computer program product are executed by a processor.

In the description of this specification, the description for the terms "an embodiment", "some embodiments", "examples", "specific examples", or "some examples", etc., means that a particular feature, structure, material, or characteristic described in connection with the embodiment or example is included in at least one embodiment or example of the present disclosure. The appearances of the above terms throughout this specification are not necessarily referring to the same embodiment or example. Furthermore, the particular features, structures, materials, or characteristics described may be combined in any appropriate manner in one or more embodiments or examples. In addition, without a contradiction, the different embodiments or examples and the features of the different embodiments or examples can be combined by those skilled in the art in the specification. In addition, terms such as "first" and "second" are used for purposes of description and are not intended to indicate or imply relative importance or implicitly indicate the number of indicated technical features. Thus, the features defined "first" and "second" may include at least one such feature explicitly or implicitly. In the description of the present disclosure, "a plurality of" means at least two, e.g., two, three, etc., unless specifically defined otherwise.

Any procedure or method described in the flow charts or described in any other way herein may be understood to include one or more modules, portions or parts for executing instruction codes that implement steps of a custom logic function or procedure. And the preferable embodiments of the present disclosure includes other implementations, in which the order of execution is different from that which is depicted or discussed, including performing functions in a substantially simultaneous manner or in an opposite order according to the related functions, which may be understood by those skilled in the art of the embodiments of the present disclosure.

The logic and/or steps described in other manners herein or shown in the flowchart, for example, a particular sequence table of executable instructions for realizing the logical function, may be specifically achieved in any computer-readable medium to be used by an instruction execution system, a device, or an equipment (e.g., a system based on computers, a system including processors, or other systems capable of obtaining the instructions from the instruction execution system, device, or equipment and executing the instruction), or to be used in combination with the instruction execution system, device, or equipment. As to this specification, the "computer-readable medium" can be any device adaptive for including, storing, communicating, propagating, or transferring program to be used by or in connection with the instruction execution system, device, or equipment. More specific examples (a non-exhaustive list) of the computer-readable medium include: an electrical connection (electronic device) having one or more wiring lines, a portable computer diskette (magnetic device), a random access memory (RAM), a read-only memory (ROM), an erasable programmable read-only memory (EPROM or Flash memory), an optical fiber device, and a portable compact disc read-only memory (CDROM). In addition, the computer-readable medium may even be paper or other appropriate medium capable of printing programs thereon, that is because, for example, the paper or other appropriate medium may be optically scanned and then edited, decrypted or processed with other appropriate methods when necessary, and then the programs may be stored in the computer memories.

It should be understood that each part of the present disclosure may be implemented in hardware, software, firmware, or a combination thereof. In the embodiments described above, a plurality of steps or methods may be implemented in software or firmware stored in memory and executed by a suitable instruction execution system. For example, if implemented in hardware, likewise in another embodiment, it may be implemented by one or a combination of the following techniques known in the art: a discrete logic circuit with a logic gate circuit for realizing a logic function of a data signal, an application-specific integrated circuit with an appropriate combinational logic gate circuit, a programmable gate array (PGA), a field programmable gate array (FPGA), etc.

The skilled in the art will understand that all or a part of the steps carried by the method of the above embodiments may be completed by a program. The program includes one of the embodiments of the method or the combination thereof when being executed.

In addition, each functional unit in the various embodiments of the present disclosure may be integrated in one processing module, each unit may exist physically alone, or two or more units may be integrated in one unit. The forgoing integrated units can be implemented in the form of hardware or a software functional module. If the integrated module is implemented as software functional module and is sold or used as a stand-alone product, it may also be stored in a computer-readable storage medium.

The above-mentioned storage medium may be a read-only memory, a disk or a disc, or the like. Although embodiments of the present disclosure have been shown and described above, it should be understood that the above-described embodiments are exemplary and cannot be understood to limit the present disclosure. The skilled in the art may make changes, modifications, replacements and variations in the above embodiments within scope of the present disclosure.

What is claimed is:

1. A method for detecting a fault of a monitoring device, comprising:
   obtaining monitoring data collected by the monitoring device at a preset sampling period, wherein the monitoring data comprises monitoring values respectively corresponding to a plurality of sampling points;
   calculating a monitoring value change rate between each monitoring value and a following monitoring value adjacent to the monitoring value based on the preset sampling period, to obtain a monitoring value change rate of each monitoring value;
   performing normalization processing on each monitoring value to obtain a normalized monitoring value corresponding to each monitoring value;
   determining a first number of monitoring values each having the monitoring value change rate greater than a preset change rate threshold and the normalized monitoring value greater than a preset monitoring value threshold;
   judging whether the first number is less than a first preset number threshold; and
   determining that the monitoring device has a fault in response to determining that the first number is greater than or equal to the first preset number threshold.

2. The method according to claim 1, further comprising:
   determining a second number of monitoring values each having the monitoring value change rate equal to zero;
   judging whether the second number is greater than or equal to a second preset number threshold and whether each of the monitoring values is equal to zero in response to determining that the first number is less than the first preset number threshold; and
   determining that the monitoring device has a fault in response to determining that the second number is greater than or equal to the second preset number threshold and a monitoring value not equal to zero exists.

3. The method according to claim 1, wherein performing normalization processing on each monitoring value to obtain the normalized monitoring value corresponding to each monitoring value comprises:
   obtaining a maximum monitoring value and a minimum monitoring value of the monitoring values; and
   performing normalization processing on each monitoring value based on the maximum monitoring value and the minimum monitoring value, to obtain the normalized monitoring value corresponding to each monitoring value.

4. The method according to claim 1, wherein the preset monitoring value threshold is determined in advance by:
   obtaining historical normal monitoring data and historical abnormal monitoring data, in which, the historical normal monitoring data comprises a plurality of normal monitoring values, and the historical abnormal monitoring data comprises a plurality of abnormal monitoring values;
   performing normalization processing on each normal monitoring value to obtain a normalized normal monitoring value corresponding to each normal monitoring value;
   performing normalization processing on each abnormal monitoring value to obtain a normalized abnormal monitoring value corresponding to each abnormal monitoring value; and
   determining the preset monitoring value threshold according to a distribution condition of the normalized normal monitoring values and the normalized abnormal monitoring values.

5. The method according to claim 4, wherein a sampling period between monitoring values in the historical normal monitoring data and a sampling period between monitoring values in the historical abnormal monitoring data are equal to the preset sampling period, and the method further comprises:
   calculating a monitoring value change rate between each abnormal monitoring value and a following abnormal monitoring value adjacent to the abnormal monitoring value based on the preset sampling period, to obtain a monitoring value change rate of each abnormal monitoring value;
   obtaining a plurality of target abnormal monitoring values each having the normalized abnormal monitoring value greater than the preset monitoring value threshold, and obtaining a monitoring value change rate of each target abnormal monitoring value;
   calculating a mean value and a standard deviation of the monitoring value change rates of the target abnormal monitoring values according to the monitoring value change rate of each target abnormal monitoring value; and
   determining the preset change rate threshold according to a 3σ criterion and the mean value and the standard deviation of the monitoring value change rates of the target abnormal monitoring values.

6. The method according to claim 1, wherein the first preset number threshold is determined by:
   obtaining a plurality of time periods of historical abnormal monitoring data present in historical statistics;
   determining a mean value and a standard deviation of the time periods of the historical abnormal monitoring data according to the plurality of time periods of the historical abnormal monitoring data;
   determining a critical period of the time periods of the historical abnormal monitoring data according to a 3σ criterion and the mean value and the standard deviation of the time periods of the historical abnormal monitoring data; and
   determining the first preset number threshold according to a preset calculation relation between critical periods and first preset number thresholds and the critical period.

7. A device for detecting a fault of a monitoring device, comprising:
   a processor; and
   a memory, coupled to the processor and configured to store a computer program executable by the processor;
   wherein the processor is configured to:
      obtain monitoring data collected by the monitoring device at a preset sampling period, wherein the monitoring data comprises monitoring values respectively corresponding to a plurality of sampling points;
      calculate a monitoring value change rate between each monitoring value and a following monitoring value adjacent to the monitoring value based on the preset sampling period, to obtain a monitoring value change rate of each monitoring value;

perform normalization processing on each monitoring value to obtain a normalized monitoring value corresponding to each monitoring value;
determine a first number of monitoring values, a monitoring value each having the monitoring value change rate greater than a preset change rate threshold and the normalized monitoring value greater than a preset monitoring value threshold;
judge whether the first number is less than a first preset number threshold; and
determine that the monitoring device has a fault in response to determining that the first number is greater than or equal to the first preset number threshold.

8. The device according to claim 7, wherein the processor is further configured to:
determine a second number of monitoring values each having the monitoring value change rate equal to zero;
judge whether the second number is greater than or equal to a second preset number threshold and whether each of the monitoring values is equal to zero in response to determining that the first number is less than the first preset number threshold; and
determine that the monitoring device has a fault in response to determining that the second number is greater than or equal to the second preset number threshold and a monitoring value not equal to zero exists.

9. The device according to claim 8, wherein the processor is configured to:
obtain a maximum monitoring value and a minimum monitoring value of the monitoring values; and
perform normalization processing on each monitoring value based on the maximum monitoring value and the minimum monitoring value, to obtain a normalized monitoring value corresponding to each monitoring value.

10. The device according to claim 8, wherein the processor is further configured to:
obtain historical normal monitoring data and historical abnormal monitoring data, in which, the historical normal monitoring data comprises a plurality of normal monitoring values, and the historical abnormal monitoring data comprises a plurality of abnormal monitoring values;
perform normalization processing on each normal monitoring value to obtain a normalized normal monitoring value corresponding to each normal monitoring value;
perform normalization processing on each abnormal monitoring value to obtain a normalized abnormal monitoring value corresponding to each abnormal monitoring value; and
determine the preset monitoring value threshold according to distribution conditions of the normalized normal monitoring values and the normalized abnormal monitoring values.

11. The device according to claim 10, wherein a sampling period between monitoring values in the historical normal monitoring data and a sampling period between monitoring values in the historical abnormal monitoring data are equal to the preset sampling period, and the processor is further configured to:
calculate a monitoring value change rate between each abnormal monitoring value and a following abnormal monitoring value adjacent to the abnormal monitoring value based on the preset sampling period to obtain a monitoring value change rate of each abnormal monitoring value;
obtain a plurality of target abnormal monitoring values each having the normalized abnormal monitoring value greater than the preset monitoring value threshold, and to obtain a monitoring value change rate of each target abnormal monitoring value;
calculate a mean value and a standard deviation of the monitoring value change rates of the target abnormal monitoring values according to the monitoring value change rate of each target abnormal monitoring value; and
determine the preset change rate threshold according to a $3\sigma$ criterion and the mean value and the standard deviation of the monitoring value change rates of the target abnormal monitoring values.

12. The device according to claim 8, wherein the processor is further configured to:
obtain a plurality of time periods of historical abnormal monitoring data present in historical statistics;
determine a mean value and a standard deviation of the time periods of the historical abnormal monitoring data according to the plurality of time periods of the historical abnormal monitoring data;
determine a critical period of the time periods of the historical abnormal monitoring data according to a $3\sigma$ criterion and the mean value and the standard deviation of the time periods of the historical abnormal monitoring data; and
determine the first preset number threshold according to a preset calculation relation between critical periods and first preset number thresholds and the critical period.

13. A monitoring system, comprising:
one or more monitoring devices, arranged at a plurality of sampling points, and configured to collect monitoring data at a preset sampling period, wherein the monitoring data comprises monitoring values respectively corresponding to the plurality of sampling points;
a processing device, configured to:
obtain the monitoring data;
calculate a monitoring value change rate between each monitoring value and a following monitoring value adjacent to the monitoring value based on the preset sampling period, to obtain a monitoring value change rate of each monitoring value;
perform normalization processing on each monitoring value to obtain a normalized monitoring value corresponding to each monitoring value;
determine a first number of monitoring values, a monitoring value each having the monitoring value change rate greater than a preset change rate threshold and the normalized monitoring value greater than a preset monitoring value threshold;
judge whether the first number is less than a first preset number threshold; and
determine that the monitoring device has a fault in response to determining that the first number is greater than or equal to the first preset number threshold; and
an alarm device, configured to issue an alarm prompt message if the monitoring device has a fault.

* * * * *